United States Patent
Yuda et al.

(10) Patent No.: US 8,823,225 B2
(45) Date of Patent: Sep. 2, 2014

(54) ROTATING ELECTRICAL MACHINE

(71) Applicant: Kabushiki Kaisha Yaskawa Denki, Kitakyushu (JP)

(72) Inventors: Toyofumi Yuda, Kitakyushu (JP); Toshiyuki Yamagishi, Kitakyushu (JP); Takenori Oka, Kitakyushu (JP)

(73) Assignee: Kabushiki Kaisha Yaskawa Denki, Kitakyushu-Shi (JP)

(*) Notice: Subject to any disclaimer, the term of this patent is extended or adjusted under 35 U.S.C. 154(b) by 0 days.

(21) Appl. No.: 13/792,200

(22) Filed: Mar. 11, 2013

(65) Prior Publication Data

US 2014/0084757 A1    Mar. 27, 2014

(30) Foreign Application Priority Data

Sep. 25, 2012    (JP) .................. 2012-210975

(51) Int. Cl.
*H02K 11/00*    (2006.01)
*H02K 1/28*    (2006.01)
*H02K 29/10*    (2006.01)

(52) U.S. Cl.
CPC .............. *H02K 11/0026* (2013.01); *H02K 1/28* (2013.01); *H02K 29/10* (2013.01)
USPC ..................................................... 310/68 B

(58) Field of Classification Search
USPC ..................................................... 310/68 B
IPC ................................................. H02K 11/0026
See application file for complete search history.

(56) References Cited

U.S. PATENT DOCUMENTS

| | | | | |
|---|---|---|---|---|
| 5,369,322 A | * | 11/1994 | Maruyama et al. | 310/39 |
| 5,532,533 A | * | 7/1996 | Mizutani | 310/68 B |
| 5,821,648 A | * | 10/1998 | Allinson | 310/68 B |
| 6,693,422 B2 | * | 2/2004 | Lutz | 324/207.2 |
| 6,906,448 B2 | * | 6/2005 | Yoshino et al. | 310/216.094 |
| 6,909,212 B2 | * | 6/2005 | Uchiyama | 310/68 B |
| 2008/0238226 A1 | | 10/2008 | Miyamoto | |

FOREIGN PATENT DOCUMENTS

| | | |
|---|---|---|
| JP | 2-065079 U | 5/1990 |
| JP | 3-222653 | 10/1991 |
| JP | 7-239244 | 9/1995 |
| JP | 9-308171 | 11/1997 |
| JP | 2008-259252 | 10/2008 |
| JP | 2011-095180 | 5/2011 |

OTHER PUBLICATIONS

Japanese Office Action for corresponding JP Application No. 2012-210975, Mar. 11, 2014.

* cited by examiner

*Primary Examiner* — Dang Le
(74) *Attorney, Agent, or Firm* — Mori & Ward, LLP

(57) ABSTRACT

A motor includes: a almost annular stator, a rotor arranged inside the annular ring of the stator for rotating about a central axis, a sensor for detecting the rotation of the rotor, and a sensor board for implementing the sensor. The sensor and the sensor board are arranged outside the stator in the direction along the central axis. The sensor is a reflection type light projecting/receiving sensor.

12 Claims, 4 Drawing Sheets

ROTATING ELECTRICAL MACHINE

CROSS-REFERENCE TO RELATED APPLICATIONS

The present application claims priority under 35 U.S.C. §119 to Japanese Patent Application No. 2012-210975, filed Sep. 25, 2012. The contents of this application are incorporated herein by reference in their entirety.

BACKGROUND ART

Field of the Invention

The present invention relates to rotating electrical machine.

Conventionally, a rotation sensor is provided in rotating electrical machines for controlling the rotation of a rotating electrical machine such as an electrical motor. The rotation sensor optically detects the rotation of the rotor. For example, a sensor board for processing signals detected by some rotation sensors is arranged in a motor (refer to Japanese Unexamined Patent Application Publication 2008-259252, for example). In this case, the sensor board is arranged inside the hollow core of a stator in order to achieve downsizing of the motor. Moreover, the influence of noise on the rotation sensor and the sensor board from the stator is said to be reduced.

SUMMARY OF THE INVENTION

Problem to be Solved by the Invention

The rotating electrical machine includes: an almost annular stator; a rotor arranged inside the annular ring of the stator for rotating about a rotation shaft; a detection element for detecting rotation of the rotor; and a detection board for implementing the detection element. The detection element and the detection board are arranged outside the stator in the direction along the rotation shaft. The detection element is a reflection type light projecting/receiving sensor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
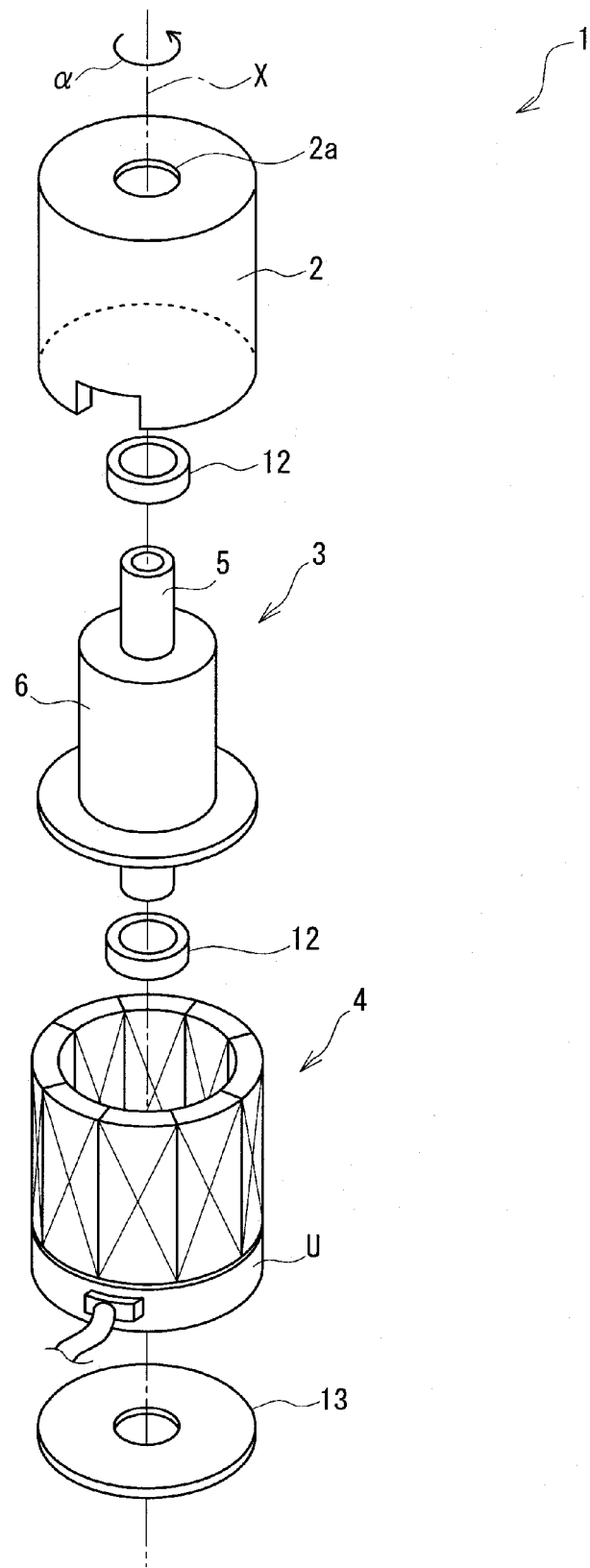
FIG. 1 shows an exploded perspective view of the motor related to Embodiment 1.

The embodiments will now be described with reference to the accompanying drawings, wherein like reference numerals designate corresponding or identical elements throughout the various drawings.

Hereinafter, a motor (electrical motor) 1 as a type of a rotating electrical machine related to Embodiments is described with respect to the drawings. FIG. 1 is an exploded perspective view of the motor 1 related to Embodiments. The motor 1 is an inner rotor type direct-drive (DD) motor. Servo control is possible with the motor 1. In the rotor 3, a permanent magnet is used as a magnetic field. The motor 1 comprises a motor case 2, a rotor (rotator, inner rotor) 3, a bearing 12, a stator (outer stator) 4, and an encoder unit U.

The motor case 2 is a casing configuring the outer wall of the motor 1 with a through hole 2a opening in the upper surface thereof. The rotor 3 is arranged as a field magnet inside the motor case 2. The rotor 3 is constituted such that at the center of a rotor core 6, a metal shaft 5 is fixed by press-fitting, shrink-fitting, etc. In the present embodiment, the shaft 5 is, for example, a hollow shaft. Between the motor case 2 and the rotor 3, the bearing 12 is arranged. The rotor 3 includes a plurality of permanent magnets seriately arranged so as to be of alternately differing poles. The plurality of permanent magnets is circumferentially arranged along the circumferential surface of the rotor 3.

The shaft 5 penetrates the center hole of the bearing 12 and the through hole 2a of the motor case 2. The outer ring of the bearing 12 is connected to the motor case 2 and by means of the inner ring of the bearing 12 connected to the shaft 5 of the rotor 3, the entire rotor 3 is made rotatable in the α direction of the arrow in the figure, revolving around the central axis (rotation shaft) X of the shaft 5 with respect to the motor case 2.

The bearing 12 can be configured to be sandwiched between the motor case 2 and the rotor 3 without connecting to the motor case 2 and/or the rotor 3. Below the rotor 3, a bottom ring 13 covering the bottom surface of the motor case 2 is arranged. The bearing 12 is also arranged between the rotor 3 and the bottom ring 13 such that it rotatably supports the rotor 3.

Moreover, in the present specifications, for convenience, the vertical direction in FIG. 1 is defined as the vertical direction in the motor 1, using names such as the upper surface, bottom surface, etc. However, needless to say, the vertical direction is not limited to the vertical direction in FIG. 1, depending on the manner in which the motor is used.

Outside the rotor 3, a stator 4 as an armature is arranged so as to surround the rotor 3. The overall cross-section of the stator 4 through the axial orthogonal plane (the plane with a central axis X in the normal direction) is circular. The stator 4 includes a stator core (not shown) with a plurality of circumferentially arranged teeth and a plurality of armature coils (not shown) inserted into the plurality of teeth, respectively. The respective armature coils are connected to an AC power supply corresponding to each phase from among: two-phase, three-phase, or more. When each phase is energized by an electrical current of different phases, the rotor 3 is adapted to rotate via electromagnetic induction. Detailed descriptions of the structure and function of the stator are abbreviated.

Inside the motor case 2, an encoder unit U is arranged downward from the stator 4 and upward from a lower cover 13. The encoder unit U detects the rotation speed of the rotor 3. A controller (not shown) is connected to the motor 1. The rotation speed detected by the encoder unit U is transmitted to the controller and feedback control (servo control) based on the rotation speed is adapted to be performed.

Figure 2:
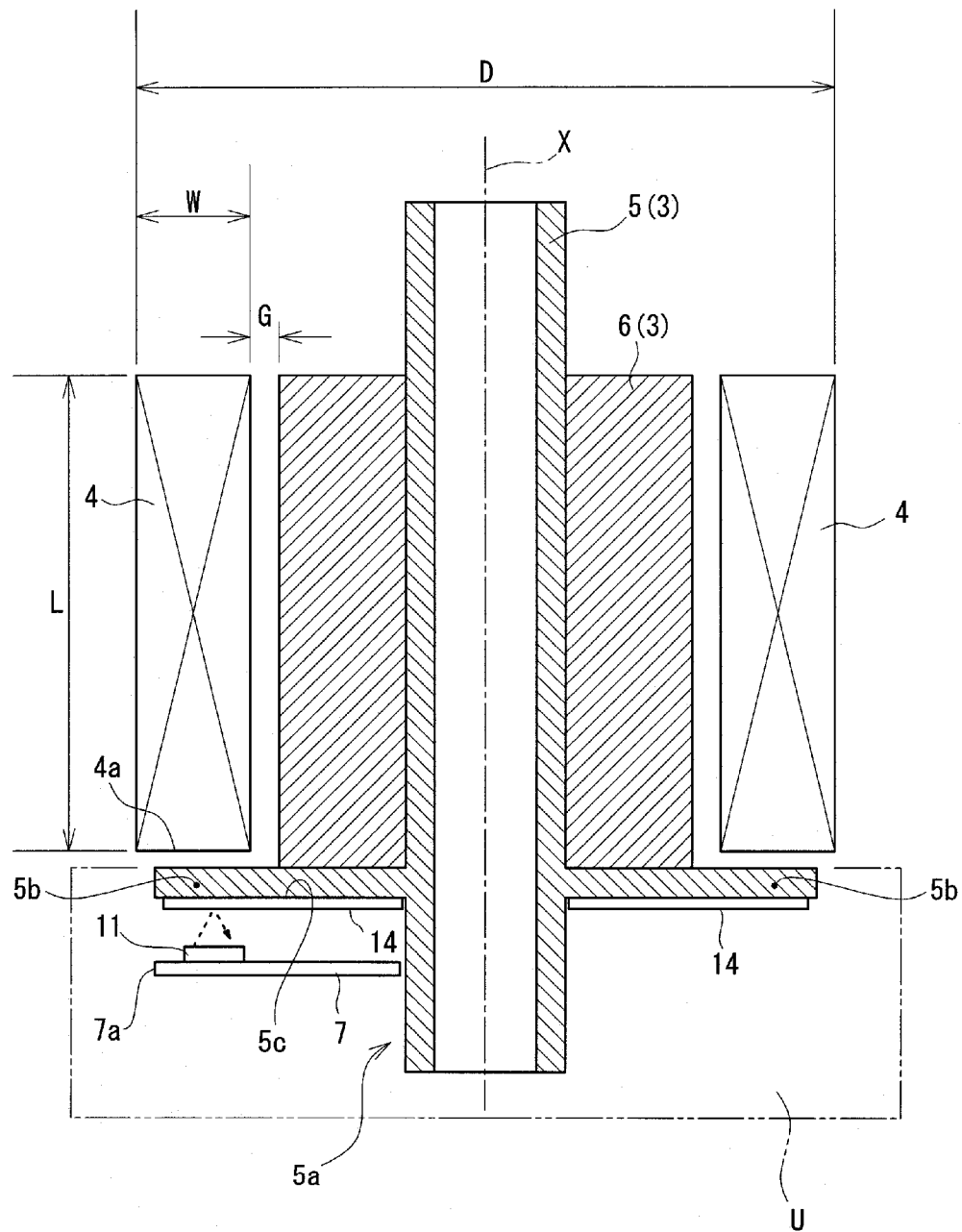
FIG. 2 shows a structural drawing showing the outline of the internal structure of the encoder unit shown in FIG. 1.

FIG. 2 is a structural drawing showing the outline of the internal structure of the encoder unit U. FIG. 2 shows a state in which the encoder unit U is cut by a plane along the central axis X of the motor 1. A sensor (detection element) 11 and a sensor board (detection board) 7 for implementing the sensor 11 are arranged in the encoder unit U. The lower part (one end part) 5a of the shaft 5 penetrates the encoder unit U.

The sensor 11 is an element for detecting rotation of the shaft 5 (=rotation of the rotor 3) and a reflection type optical sensor is employed in the present embodiment. Accordingly, detection light is floodlighted from the sensor 11 to the shaft 5 (more specifically, to a disk 14 to be mentioned later), then reflected light from the shaft 5 is received again by the sensor 11. The sensor board 7 is a circuit board with the sensor 11 implemented on its surface.

As shown in FIG. 2, a flange part 5b projecting toward the outer circumference of the shaft 5 is formed in the vicinity of the lower part 5a of the shaft 5. A disk (detection object) 14 is arranged on the lower face (opposing face) 5c of the flange part 5b. The disk 14 is a planar view circular or planar view annular resin film, for example. The outer diameter of the disk 14 is assumed to be equal to or smaller than the outer diameter of the flange part 5b so as not to protrude from the flange part 5b. When arranging the disk 14 on the lower face 5c, the disk 14 is protected by the flange part 5b. This can avoid a situation in which the edge part of the disk 14 is damaged during the assembling process of the motor 1. The planar view means the view in the direction along the central axis X.

On the disk 14, a plurality of detection lines is formed radially. Detection light from the sensor 11 radiates the lines on the disk 14 and is reflected to be received by the sensor 11 again. Based on the number of lines detected over a constant time, the number of rotations of the rotor 3 (i.e., rotation speed) is measured.

The stator 4 is arranged on the circumference of the rotor 3 so as to ensure a magnetic gap G with the rotor 3. With the motor 1 according to the present embodiment, the stator 4, the flange part 5b of the shaft 5, the sensor 11, and the sensor board 7 are arranged as shown in FIG. 2. That is, the lower part 4a of the stator 4 is located at the upper part of the flange part 5b. A part or all of the stator 4 overlaps the flange part 5b in the planar view. In other words, the outer circumference of the stator 4 is located inside of the outer circumference of the flange part 5b or vicinity thereof. In FIG. 2, although the outer circumference of the stator 4 is located at a position in the vicinity a little outside the outer circumference of the flange part 5b in the planar view, most of the stator 4 is located inside the outer circumference of the flange part 5b.

The sensor 11 opposes the lower face 5c and is arranged on opposite side the stator 4 when viewed from the flange part 5b. The flange part 5b is located between the sensor board 7 and stator 4. That is, in the direction along the central axis X, the sensor 11 and sensor board 7 are arranged outside the stator 4. The sensor board 7 overlaps the flange part 5b in the planar view. The end part 7a of the sensor board 7 is arranged at a position so as not to protrude from the outer circumference of the flange part 5b in the planar view.

The motor 1 employs a reflection type sensor 11 for detecting the rotation of the rotor 3. No light-emitting element for floodlighting is provided separately from the sensor. Therefore, the stator 4 does not have to be arranged while avoiding the light-emitting element. As a result, a margin is created for the internal space of the motor 1. It is possible to reduce an outer diameter D of the stator 4 while maintaining the property of the motor. The outer diameter of the entire motor 1 can be made small. While downsizing the outer diameter of the stator 4, a size W in the radial direction of the stator 4 can be increased, enabling the number of winding wires of an armature coil to be increased. The properties of the motor are improved, and at a time, a length L of the stator 4 can also be reduced while maintaining the property of the motor. The total length of the motor 1 can be reduced.

The flange part 5b is located between the sensor 11 and the sensor board 7, and the stator 4. The flange part 5b is integrally formed with the shaft 5, providing a shielding effect from electromagnetic noise since it is made of metal. The flange part 5b effectively prevents the electromagnetic noise from the stator 4 from affecting elements and circuits on the sensor board 7.

As above, the embodiment of the present invention was described; however, the present invention is not limited to this and various arrangements and modifications are possible within the range of the summary thereof.

In the abovementioned embodiments, the rotating electrical machine has been described as a motor (electrical motor) 1; however, the rotating electrical machine may be a generator including the rotor 3 and the stator 4 with the same configuration as the motor 1. In addition, the number of slots of the stator 4 is not limited. The motor is not limited to the outer stator (inner rotor) type explained in the embodiment. An inner stator (outer rotor) type motor may be applicable. In addition, the DD motor is not limited as long as the motor performs servo control.

The flange part may be formed in the vicinity of one end part of the rotor, located between the stator and detection board, and may project from the rotor toward the outer circumference so as to block between the stator and detection board. When viewed along the rotation shaft, the detection element and the detection board may be arranged so as not to protrude outside the flange part.

A detection object that detects the rotation of the rotor by the detection element may be arranged on the face opposing the detection element of the flange part.

Figure 4:
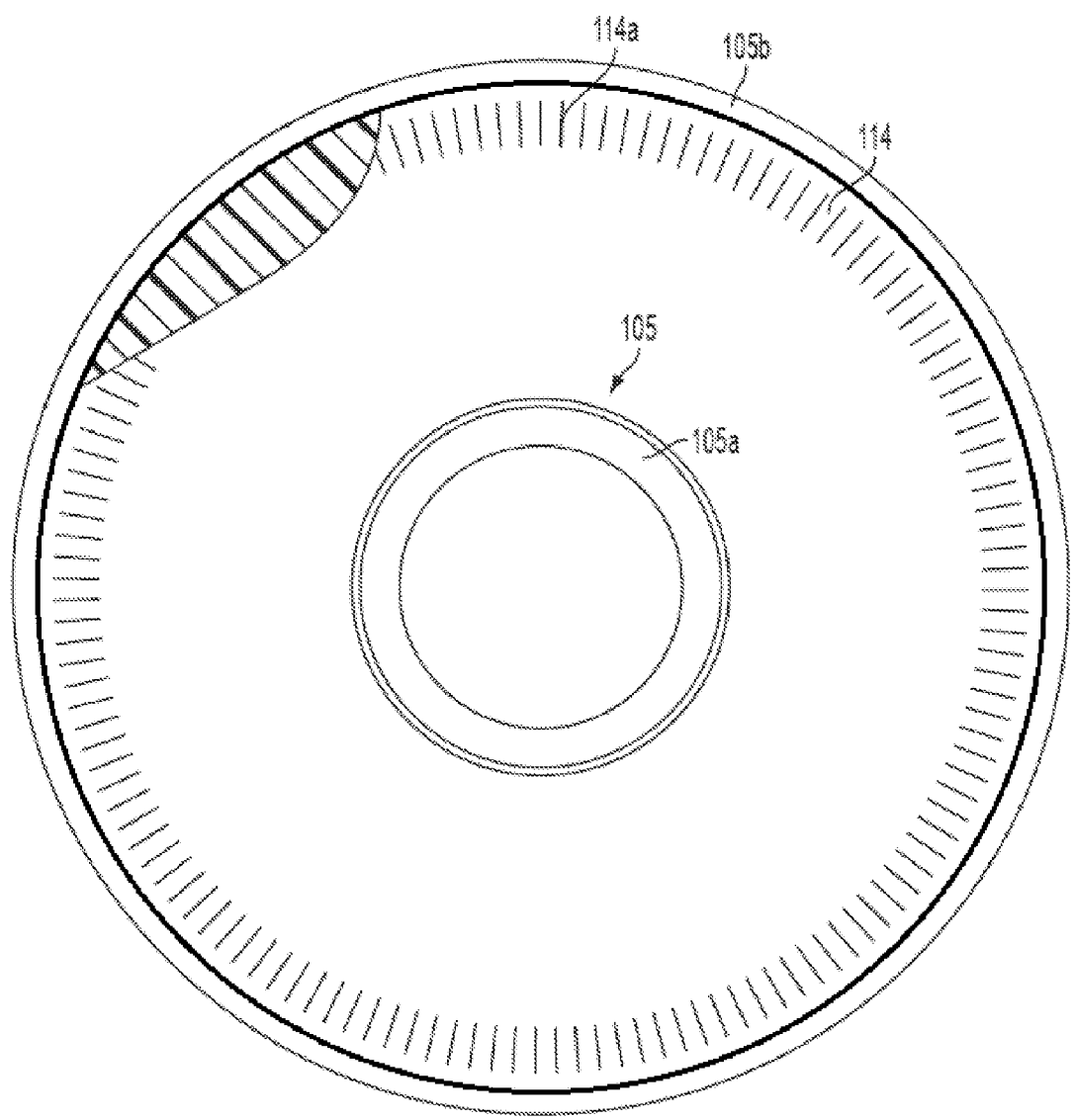
FIG. 4 shows a bottom view of a shaft of the encoder unit including a detection object made of an annular resin film shown with a partially cut-away portion.

FIG. 4 shows a bottom view of a shaft 105 of the encoder unit including a detection object 114 made of an annular resin film shown with a partially cut-away portion. The detection object may be a planar view circular shape or a planar view annular shape and arranged so as not to protrude outside the flange part. In FIG. 4, the detection object 114 has an annular shape that extends from an outer surface of the lower part 105a of the shaft 105 towards the outer edge of the flange part 105b. The detection object may be a disk on which a plurality of detection lines 114a is formed radially. Alternatively, the detection object may be a resin film, as can be seen from the partially cut-away portion of the detection object 114 shown in FIG. 4.

The rotor may include a rotor shaft configuring a rotation shaft and a rotor core arranged on the outer circumference of the rotor shaft. The flange part may be formed on the rotor shaft.

The rotor shaft may be a hollow shaft.

The rotor shaft may be fixed at the center of the core in the planar view by shrink-fitting.

The rotor shaft may be fixed at the center of the core in the planar view by press-fitting.

The rotating electrical machine may be a motor or a generator.

Obviously, numerous modifications and variations of the present invention are possible in light of the above teachings. It is therefore to be understood that within the scope of the appended claims, the invention may be practiced otherwise than as specifically described herein.

<Conventional Encoder Unit U2>

Figure 3:
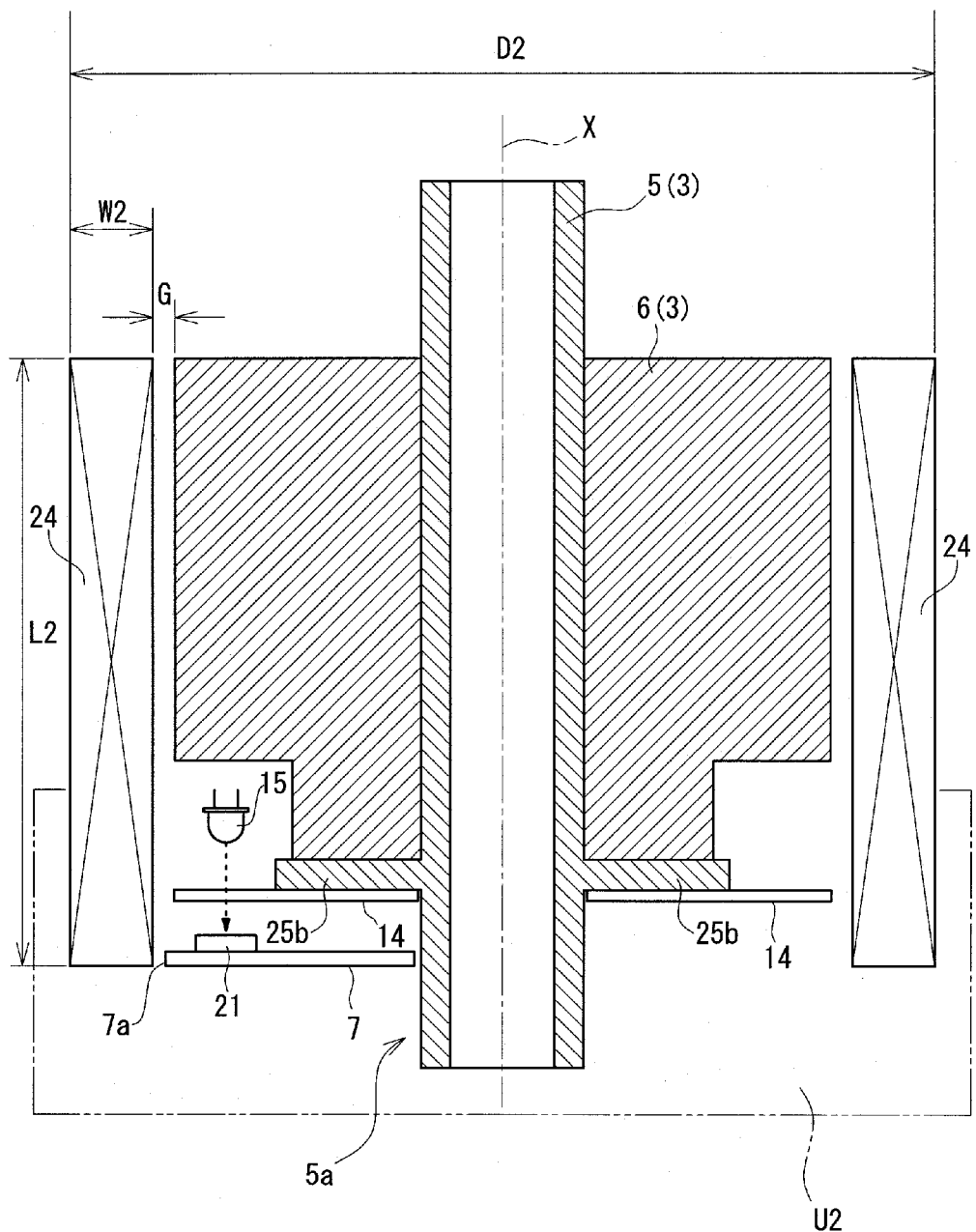
FIG. 3 shows a structural drawing showing the outline of the internal structure of a conventional encoder unit.

FIG. 3 shows a structural drawing showing the outline of the internal structure of a conventional encoder unit U2. FIG. 3 shows a state in which the encoder unit U2 is cut in the plane along the central axis X of the motor. In addition, in FIG. 3, the same symbols are given to the same configuration as FIG. 2 and descriptions are abbreviated.

A sensor (detection element) 21, a sensor board (detection board) 7 for implementing the sensor 21, and an LED (light-emitting element) 15 are arranged in an encoder unit U2. In addition, the lower part (one end part) of a shaft 5a enters the encoder unit U2.

The sensor 21 is an element for detecting the rotation of the rotor 3 like the sensor 11. The sensor 21 is a transmission type optical sensor. The sensor 21 receives detection light from a LED 15 through the disk 14. The LED 15 is arranged on the opposite side from the sensor 21 when viewed from the disk 14. That is, the LED 15 is located at the upper part of the flange part 25b.

The detection light from the LED 15 is adapted to transmit the disk 14 to reach the sensor 21. Therefore, the disk 14 needs to have a transparent film as a base material. A plurality of detection lines are formed on such transparent film. The detection position of the disk 14, that is, the transit position of the detection light has to be outside the flange part 25b. Accordingly, the disk 14 is arranged so as to partially protrude from the flange part 25b.

Since the LED 15 is arranged upwards from flange part 25b, the stator 24 has to be arranged by avoiding the LED 15. That is, an outer diameter D2 of a stator 24 is larger than the outer diameter D of the stator 4. Alternatively, a size W2 in the radial direction of the stator 24 is smaller than the size W in the radial direction of the stator 4. Compared with the above motor 1 according to the embodiment, a conventional motor has a larger outer diameter or poorer motor property. In order to ensure the property of the motor, as shown in FIG. 3, it is necessary to make a length L2 of the stator 24 longer than the length L of the stator 4 to extend to the position up to the position downward of the flange part 25b.

The disk 14 has to be arranged while protruding from the flange part 25b. Accordingly, the flange part 25b is not located between the sensor 21 and the sensor board 7, and the stator 24. The flange part 25b blocks almost no electromagnetic noise from the stator 24 that affects the element and circuit on the sensor board 7. In order to prevent the electromagnetic noise from the stator 24 from affecting the element and circuit on the sensor board 7, a metal tape (aluminum tape, copper foil tape, and the like) for preventing electromagnetic noise needs to be arranged at the position between the stator 24 and sensor board 7, for example, at the end part 7a of the sensor board 7.

What is claimed is:

1. A rotating electrical machine, comprising:
   a stator of a substantially annular shape,
   a rotor arranged inside an annular ring of the stator for rotating about a rotation axis,
   a detection element for detecting the rotation of the rotor,
   a circuit board for implementing the detection element, the detection element being provided on the circuit board, and
   a flange part formed in a vicinity of one end part of the rotor, wherein
   the detection element and the circuit board are arranged outside the stator in the direction along the rotation axis,
   the detection element is a reflection type light projecting/receiving sensor,
   the flange part is located between the stator and the circuit board and projects from the rotor towards an outer circumference of the rotating electrical machine so as to block between the stator and the circuit board, and
   the circuit board extends in a direction parallel to the flange part and has an outermost end part that is arranged at a position so as not to protrude from an outermost circumference of the flange part.

2. The rotating electrical machine according to claim 1, wherein,
   when viewed in a direction along the rotation axis, the detection element is arranged so as not to protrude outside the flange part.

3. The rotating electrical machine according to claim 1, wherein
   a detection object configured to be used for detecting the rotation of the rotor by the detection element is arranged on a face of the flange part opposing the detection element.

4. The rotating electrical machine according to claim 3, wherein
   the detection object has a planar view circular shape or a planar view annular shape and is arranged so as not to protrude outside the flange part.

5. The rotating electrical machine according to claim 3, wherein
   the detection object is a disk on which a plurality of detection lines is formed radially.

6. The rotating electrical machine according to claim 3, wherein
   the detection object is a resin film.

7. The rotating electrical machine according to claim 1, wherein
   the rotor includes a rotor shaft configured to rotate about the rotation axis and a rotor core arranged on an outer circumference of the rotor shaft, and
   the flange part is formed on the rotor shaft.

8. The rotating electrical machine according to claim 7, wherein
   the rotor shaft is a hollow shaft.

9. The rotating electrical machine according to claim 7, wherein
   the rotor shaft is fixed at a center of the rotor core in the planar view by shrink-fitting.

10. The rotating electrical machine according to claim 7, wherein
    the rotor shaft is fixed at the center of the rotor core in the planar view by press-fitting.

11. The rotating electrical machine according to claim 1, wherein
    the rotating electrical machine is a motor.

12. The rotating electrical machine according to claim 1, wherein
    the rotating electrical machine is a generator.

* * * * *